United States Patent
Dilz, Jr.

[11] Patent Number: 5,864,061
[45] Date of Patent: Jan. 26, 1999

[54] MINIATURE SPORTS RADAR SPEED MEASURING DEVICE

[76] Inventor: Albert E. Dilz, Jr., 11351 Embassy Dr., Cincinnati, Ohio 45240

[21] Appl. No.: 796,665

[22] Filed: Feb. 5, 1997

[51] Int. Cl.[6] .................................................. G01P 1/07
[52] U.S. Cl. ............................................ 73/488; 473/415
[58] Field of Search ....................... 73/657, 488, 514.27; 273/371, 378; 473/415, 180, 190, 192, 198, 199, 458, 451, 455; 342/115, 104, 99

[56] References Cited

U.S. PATENT DOCUMENTS

| | | |
|---|---|---|
| 3,852,743 | 12/1974 | Gupta . |
| 4,276,548 | 6/1981 | Lutz ......................................... 342/115 |
| 4,915,384 | 4/1990 | Bear ......................................... 473/451 |
| 5,199,705 | 4/1993 | Jenkins et al. . |
| 5,401,026 | 3/1995 | Eccher ..................................... 473/199 |
| 5,419,540 | 5/1995 | Galloway ................................. 473/455 |
| 5,553,846 | 9/1996 | Frye ......................................... 473/458 |
| 5,570,094 | 10/1996 | Armstrong ............................... 342/115 |

*Primary Examiner*—Christine K. Oda
*Attorney, Agent, or Firm*—Wood, Herron & Evans, L.L.P.

[57] ABSTRACT

A sensor is provided for measuring the speed of a moving sports object, for example a ball such as a baseball or softball. The sensor is operable over a short range and is preferably mounted in close proximity to the path of the moving object. For measuring the speed of a ball, the sensor is preferably mounted on or in a ball glove or is otherwise mounted on the forearm of a person catching or otherwise receiving or interacting with the ball, for example, by wearing the sensor on such person's wrist. The sensor measures the speed of a ball about to be caught, for example, and displays the speed of the ball to the catching player. The sensor of the preferred embodiment utilizes CW Doppler radar in the form of a microwave radio frequency transmitter and receiver that has a single-transistor integrated antenna/oscillator. A simple, low cost unit having a low radiation and low energy consumption transmitter, receiver and signal processor, is provided.

18 Claims, 2 Drawing Sheets

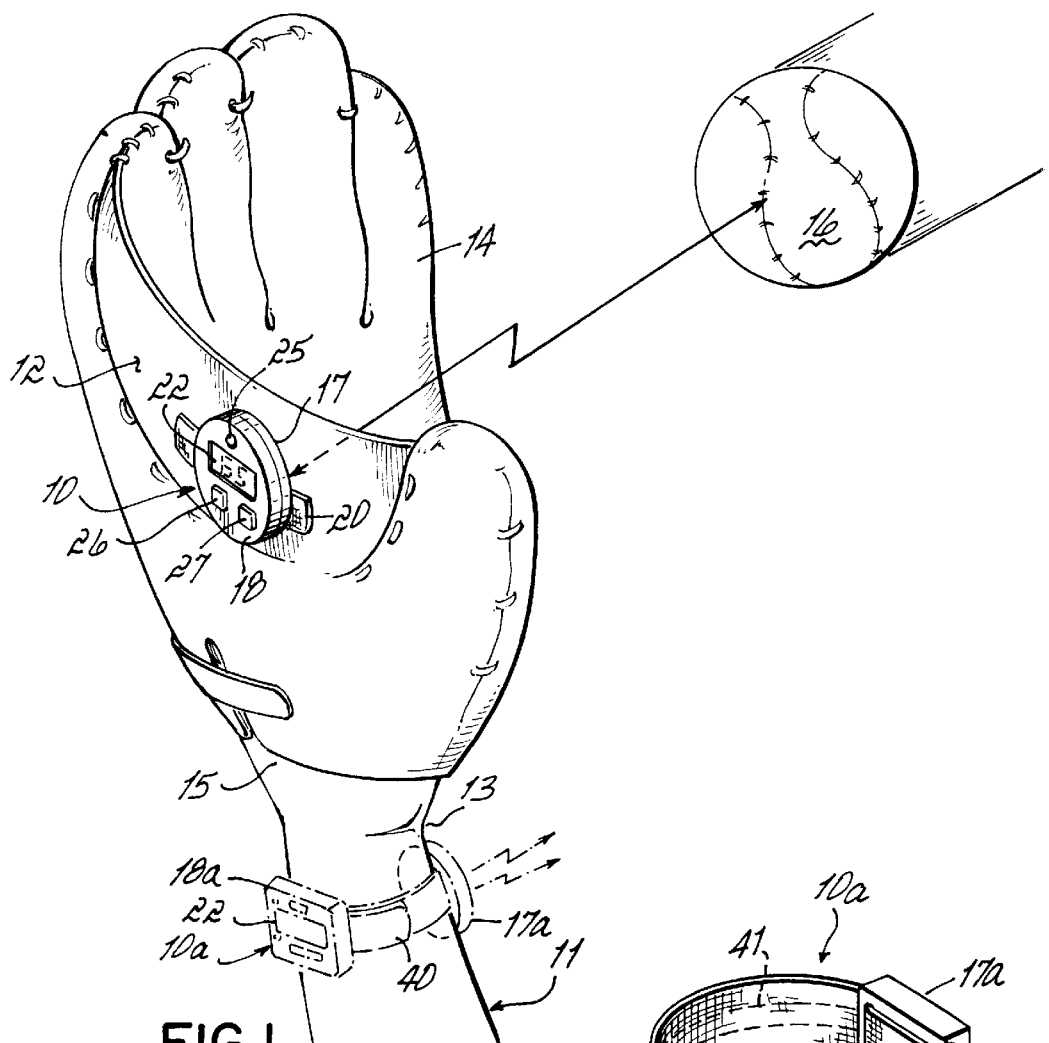
FIG. 1
FIG. 1A
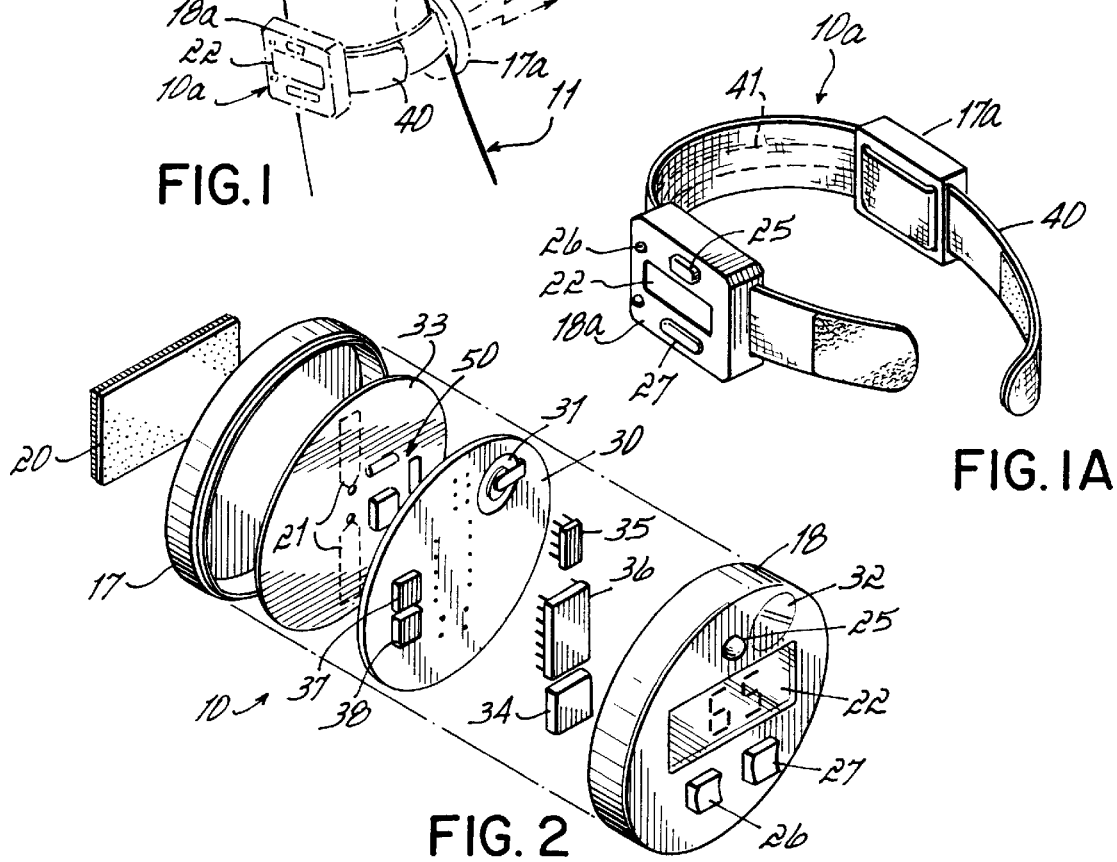
FIG. 2

MINIATURE SPORTS RADAR SPEED MEASURING DEVICE

This invention relates to speed measuring devices particularly suited for use in determining velocity magnitude or speed of sports objects, and more particularly, to low-cost low-energy radar devices for use in measuring the speed of baseballs, softballs and other sports objects by players during training.

BACKGROUND OF THE INVENTION

It is well known that continuous wave (CW) Doppler radar technology can be utilized to detect a moving object illuminated by the electromagnetic field of the radar by producing an electrical signal at a Doppler frequency which is a measure of the relative speed of the moving object. This technology has been pioneered and developed by the defense industry in the United States, is well-documented in textbooks and reports, and has found numerous applications in consumer products. Security motion sensors, industrial position sensors and police radar units are examples of current uses of Doppler radar systems.

Doppler radar has been used in sports applications to measure the velocities of sports objects or players relative to one another or relative to a reference point. Examples of sports radar in use are found in U.S. Pat. No. 4,276.548 to Lutz and U.S. Pat. No. 5,199,705 to Jenkins et al. Conventional sports radar includes "speed guns" for measuring baseball or softball speed, such as disclosed in the Lutz patent. Available sports radar units generally occupy approximately 200 cubic inches and cost several hundred dollars. These units are typically operated by a third person somewhat remote from the thrower and receiver.

Implementation of prior art CW Doppler radar systems is relatively complex, generally involving the use of an RF oscillator and signal generator, an antenna system to radiate the oscillator output into free-space and to receive a portion of the transmitted electromagnetic energy that is reflected by the moving object, a transmit-receive switch, diplexer, or circulator device if a single antenna is used for both transmit and receive rather than separate transmit and receive antennas, and various local oscillators, mixers, phase-locked-loops and other "front-end" circuits to heterodyne, demodulate and detect the Doppler signal. This complexity imposes high cost and size requirements on the radar units, which have heretofore discouraged the utilization of CW Doppler technology in consumer applications where extremely small size and low cost are necessary for practical end-product realization.

In electronics applications unrelated to those discussed above, Doppler radar systems using simple homodyne circuits have been known. Such applications include defense applications such as ordnance proximity fuzes and target detectors where Doppler modulation provides evidence of a target encounter. Validation of the presence of target signals within a prescribed Doppler frequency passband and the detection of amplitude build-up as the target encounter distance decreases are sufficient for signal processing and decision making in such systems, obviating the need to accurately measure or calculate the specific velocity magnitude or speed. For example, for general proximity sensing applications, mere detection of an increasing distance signal is satisfactory. However, applications requiring a speed measurement necessitate determination of the specific Doppler frequency and a calculation of a corresponding speed value. Such homodyne circuits are but among hundreds or thousands of circuits and modulation schemes that in some way carry speed information but which have not been considered practical for providing speed measurements. Accordingly, circuits of a size or cost that are practical for consumer applications such as sports object speed measurement have not been known or available.

Accordingly, a need exists for a low cost, effective, small size, low power device useful for measuring and displaying the speed of objects in consumer applications such as sports and sports training.

SUMMARY OF THE INVENTION

A primary objective of the present invention is to provide a small size, low cost, low power device for measuring object speed that is practical for consumer applications such as sports. It is a particular objective of the present invention to provide a sports radar unit for measuring and displaying the velocity magnitude or speed of a sports object such as a baseball.

According to principles of the present invention, there is provided CW Doppler radar speed sensor that is small in size, low in cost, low in power consumption and radiated energy, that measures and displays the speed of an object such as a baseball and displays the measured speed to a user. Further according to principles of the present invention, a device is provided that is adapted for mounting at or near the path or point of reception of the moving object, or at the "target point" at which the moving object is directed. Such positioning facilitates the use of a low-power short-range signal and accurate velocity measurement. The unit preferably transmits and receives RF energy in a microwave frequency range, preferably of a frequency of approximately 2.4 GHz.

The device according to one preferred embodiment of the invention includes a radar transmitter and receiver that employs a single simple CW Doppler homodyne circuit preferably having an oscillator-detector that is based on a single transistor, which utilizes resonant circuit elements of the oscillator as an antenna to radiate energy into free-space. A portion of the radiated energy strikes the nearby moving object and is reflected back to the oscillator-antenna circuit where it is mixed with the oscillator signal. The coherent relationship of the transmitted and received signals in a simple homodyne circuit produces a Doppler frequency modulation as the distance to the moving object changes.

The preferred embodiment of the present invention makes use of the phenomena whereby, at a given separation distance between the radar and the moving object, the received object reflected signal is exactly in-phase with, and reinforces, the oscillator signal, but as the separation distance changes by each one-quarter wavelength of the transmitted signal, the total two-way travel distance to the object and back changes by one-half wavelength, resulting in an out-of-phase or canceling relationship between the received and transmitted signals. Each distance change of one-half wavelength results in a two-way radar round trip change of one wavelength, thus producing one complete cycle of modulation. As the distance to the moving object changes by successive one-half wavelength increments, multiple cycles of modulation are produced. The frequency of this modulating signal is the Doppler frequency, which is equal to the velocity of the moving object expressed in terms of one-half wavelengths of the transmitted signal as follows:

$$f_D = \frac{v}{\lambda_t/2} = \frac{2vf_t}{c}$$

where $f_D$ is the frequency of Doppler modulation, v is the relative velocity of the moving object, $\lambda_t$ is the wavelength of the transmitted signal, $f_t$ is the frequency of the transmitted signal, c is the magnitude of the velocity of electromagnetic energy propagating in surrounding medium (free-space in this case) and is equal to the product of frequency and wavelength.

In the preferred embodiment of the invention, this resulting Doppler signal which modulates the oscillator signal is detected by filtering it out of the incoming signal, amplifying it, filtering it again and converting it to a digital signal, preferably using a zero crossing detector (ZCD). The output of the ZCD is ideally a square wave having a frequency that is the Doppler frequency. The detected digitized Doppler frequency signal is applied to the input port of a microprocessor, which measures the time between negative going zero crossings using an internal timer. The measurement of zero crossing intervals are compared to certain criteria to verify that a valid signal is being processed. Then a Doppler frequency value is calculated from the measured zero crossing information by taking the time between zero crossings in the same direction as is equal to the period of the Doppler frequency. Using the above formula, the velocity of the moving object toward the sensor, for example the speed of a thrown ball approaching the sensor, is then calculated. The calculated velocity magnitude is displayed on a small liquid crystal display (LCD).

The radar unit of the preferred embodiment of the invention is preferably located in approximately a direct line with, or at only a slight angle to, the flight of the ball or other object whose speed is being measured. It is also preferably located such that the object passes within one or a few feet of the device somewhere in the path of the object, such as at the endpoint or point of catch. This arrangement preferably places the object within a few inches of the radar unit and moving directly toward the unit so that the speed of the object is measured within close proximity to the unit. In the case of a baseball, a preferred location for the unit, or at least the antenna portion of the unit, is on the catching forearm of the person catching the ball, preferably on the hand or wrist of the catching player. In one preferred embodiment, the unit is supported on or in a baseball glove, preferably at the web portion thereof, that is being worn by a person catching the baseball. By so locating the unit, or providing the unit with a short range of effectiveness of less than ten feet, and preferably of from one to three feet, velocity errors due to off-line location are minimized, since the Doppler frequency represents the velocity of the object in a direction toward or away from the radar unit. Glove location of the radar also allows detection of the approaching ball within very close proximity to the unit and just before the baseball enters the glove pocket. Alternatively, the unit can be mounted on the catcher's wrist, hand or elsewhere on the user's forearm. This positioning fixes the relationship of the unit to the path of the ball and minimizes transmitter output power requirements, and corresponding battery power supply needs. With one preferred embodiment of the invention, transmitter output power can thus be in the order of microwatts, which is much less than the radiated power levels of most wireless consumer products such as cellular and portable telephones. Short range detection also avoids false readings of speed due to the motions or movement of the thrower.

With the baseball speed measuring radar unit mounted on the receiver's glove, the display is preferably positioned on the unit itself facing rearwardly so that the receiver can read the output upon catching the ball. Mounted on the receiver's wrist, the antenna portion of the radar unit is preferably worn on the front of the wrist facing the thrower while the display is mounted on the back of the wrist so it is visible to the catcher, with both the antenna and display portions being secured by the same wrist band, with the band containing a flat cable interconnecting the two portions. The LCD, battery, power supply, and the two switches are located in a module on the back of the wrist. In this embodiment, the unit can include a real time such as that of a conventional digital wristwatch, which can which can share the battery and power circuit with the speed measuring device and utilize the display of the device to display time of day or elapsed time.

The radar velocity sensor can be operated from a 2.5 VDC batter power supply, requiring an average current of less than one milliampere. Thus a single 3 volt nominal lithium cell capable of 160 milliampere-hours can power the sensor for a relatively long duration. Small, inexpensive cylindrical and button configuration lithium cells with this energy capability are readily available and are widely used in consumer products. Power "ON/OFF" and "Reset" switches are provided which are easily operated by the non-gloved hand of the receiver before each succeeding throw is delivered.

The velocity measurement device of the present invention is capable of being miniaturized and produced inexpensively so that it can be used in consumer applications, which, up to now, have not heretofore been addressed by the prior art. It can be built into, or attached to, a baseball or softball glove, to measure the speed of the ball being caught. The radar can be worn on throwing arms of persons "tossing" a ball or by others batting, throwing, catching or otherwise dealing with moving objects in sports or other recreational uses. Gloves can be designed to conveniently incorporate the radar in a pouch, within a glove thumb, finger or heal pad, or held by straps, bands, hook and loop fasteners or effective means. A radar unit can be built directly into the glove. Gloves may be used in various sports applications, and may be considered to include hand and other forearm garments or body fastening structures or devices.

These and other objectives and advantages of the present invention will be more readily apparent from the following detailed description of the of the preferred embodiments of the invention, in which:

BRIEF DESCRIPTION OF THE DRAWINGS

FIG. 1 is a perspective view of the catching arm of a baseball player utilizing embodiments of a baseball speed measuring device embodying principles of the present invention.

FIG. 1A is a perspective view of an alternative embodiment of the speed measuring device of FIG. 1.

FIG. 2 is an exploded perspective view of the speed measuring device of FIG. 1.

DETAILED DESCRIPTION OF THE PREFERRED EMBODIMENT

Figure 3:
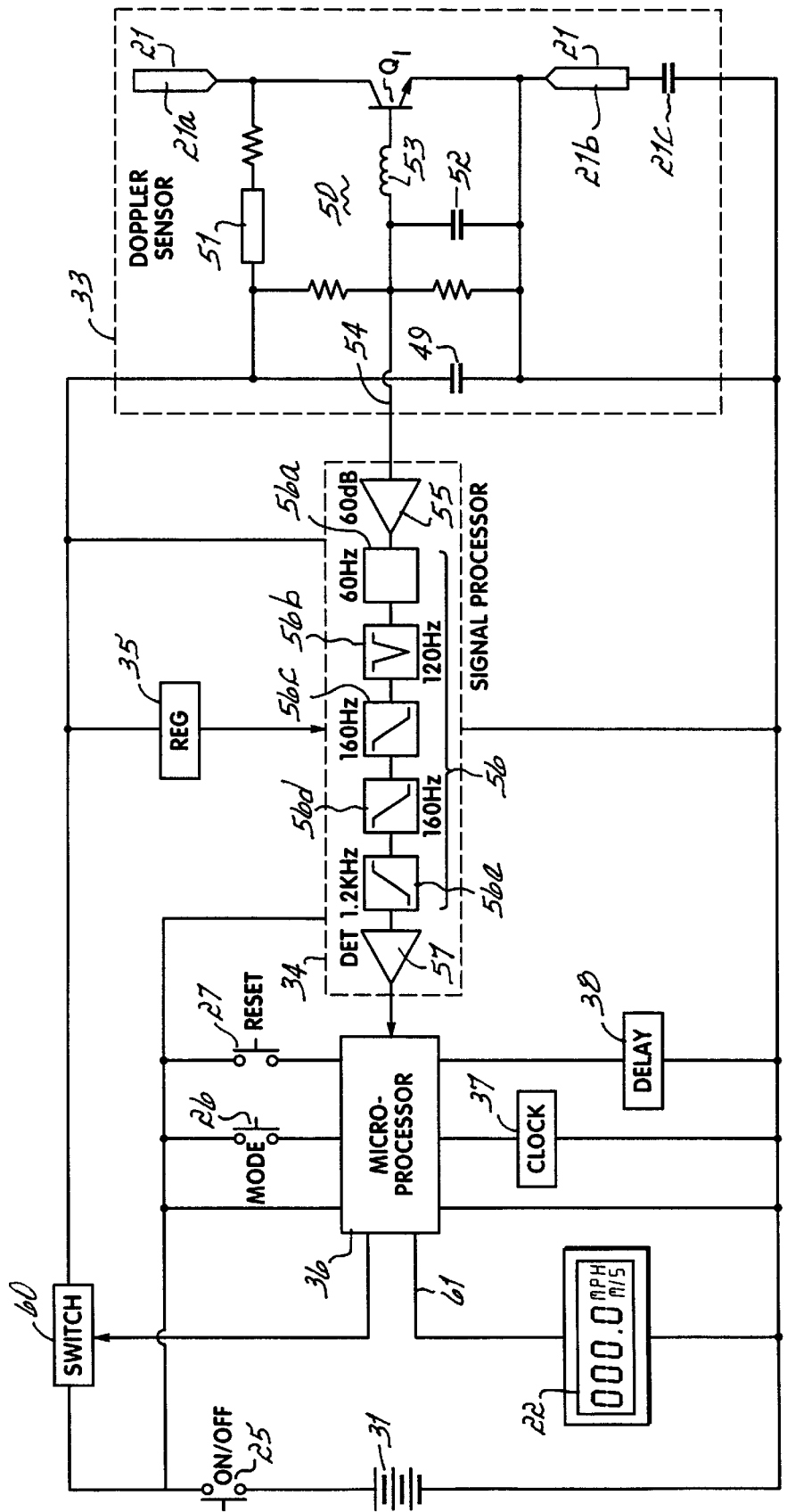
FIG. 3 is a schematic block diagram of the circuitry of the speed measuring device of FIG. 1.

FIG. 1 illustrates one embodiment of a baseball speed measuring device 10, according to principles of the present invention, secured to the back of the web 12 of a baseball glove 14 on the hand 15 of the catching arm 11 of a person catching a thrown baseball 16. The device 10, so secured to the baseball glove 14, is located in or within a few inches of the direct path of movement of the baseball 16 being caught. The device has a two part plastic housing that includes a forward facing housing 17 and a rearward facing housing 18. In the illustrated embodiment of the unit 10, the two parts of the housing 17,18 are secured together to form a single enclosure that contains the electronics of the unit 10. The forward facing housing 17 is secured by a fastening element 20, for example, a two part hook and loop fastener such as that sold under the trademark Velcro, and encloses an antenna 21 (FIGS. 2 and 3) with a radiation pattern having a main lobe that faces through the web 12 of the glove 14 and in the general direction of the incoming baseball 16. The rearward facing housing 18 contains display 22 such as an LCD having, for example, two to four digits. On the rearward facing housing 18 there is also provided a plurality of user accessible control buttons 25–27. One button 25 is a unit on/off switch. A second button 26 is a mode switch that permits sequential selection of the units of the display 22, for example, in miles per hour, kilometers per hour, feet per second or meters per second. A third button 27 is a reset or start button that powers the transmitter for a predetermined amount of time, such as ten or fifteen seconds, after which the transmitter of the unit will turn off.

As further illustrated in FIGS. 2 and 4 between the forward and rearward facing housings 17 and 18 is a circuit board 33 that contains the transmitting and receiving circuitry, and a signal processing circuit board 30 that contains the signal processing and logic of the unit 10. The circuit board 30 includes a battery 31 that is replaceable through an access door 32 in the rearward facing housing 18. The board 33 contains components and circuitry of a transmitter/oscillator circuit, which includes the strip transmission line resonator/antenna 21. Circuit board 30 contains a signal filter and processor 34 that processes the detected Doppler signal that is produced in the RF circuit by the moving object, an operational amplifier-based voltage regulator chip 35 that provides filtered regulated voltage to the signal processor chip 34 at about one-half the supply voltage of the battery 31, a microprocessor 36 that digitizes output from the signal processor 34 and interprets the detected signal as a speed reading and communicates the interpreted signal to the display 22, and clock and delay circuits 37 and 38, respectively, that are used by the microprocessor 36.

An alternative embodiment of the unit 10a is illustrated in FIG. 1A and is configured for attachment to the wrist 13 of the catching arm 11 of the person catching the baseball 16, or at least on the catcher's forearm, below the elbow, so that the unit is maintained at a constant distance from the path of the ball. With the wrist or forearm mounted unit 10a, forward and rearward facing housings 17a, 18a, respectively, are separate enclosures that are secured with a wrist or arm band 40 on opposite sides of the wrist 15 of the catcher, so that the forward facing housing 17a faces the arriving object 16 while the rearward facing housing 18a faces the catcher. The 15 separate housings 17a,18a are electrically interconnected through the conductors of a ribbon cable 41 contained in the band 40. The forward facing housing 17a contains at least the antenna 21 while the rearward facing housing 18a contains at least the display 22 and the buttons 25–27 The circuit board 30 and the components and devices thereon may be contained in either housing. Preferably, the Doppler sensor 33 and the Doppler signal processor 34 are contained in the forward facing housing 17a in close proximity to the antenna 21, while the microprocessor 36 and related circuits 37 and 38 are contained in the rearward housing 18a in close proximity to the display 22.

The electronics of the units 10 and 10a illustrated in FIG. 3 can be fabricated utilizing readily available components. The Doppler sensor circuit 33 is preferably a CW radar homodyne oscillator-detector 50 having an integral antenna circuit by which the moving object 16 is detected. The oscillator preferably operates at between 2400–2425 MHz, but may operate at other frequencies, typically in the 2000 to 10,000 MHz region. The oscillator 50 of the preferred embodiment draws about 0.6 milliamperes from a 2.5 V DC power source such as battery 31. Partially because of the location and configuration of the units 10,10a, less than ten microwatts need be transmitted into free-space by the oscillator resonant elements. These elements are preferably of a strip transmission line configuration that includes two electrically equivalent quarter wave micro-strip lines that form radiating elements 21a and 21b of the antenna 21. The elements 21a and 21b, along with a transistor Q1 and a coil 53, form a negative resistance network which oscillates with a capacitor 21c at the operating carrier frequency of, for example, 2.4 GHz. A transmission line 51 and capacitor 49 are provided to prevent parasitic oscillations in the bias network. Capacitor 52 is a bypass capacitor which creates a low impedance to ground for the carrier frequency, partially filtering the carrier signal at an outlet 54 at which the received Doppler signal can be extracted. Typical objects the size of a baseball or softball within a distance of about two feet from the radar produce a reflected Doppler frequency signal having an amplitude in the 10 to 100 microvolt range. This signal modulates the oscillator signal at the Doppler sensor output 54 of the sensor circuit 33.

A portion of the modulated oscillator signal that has been filtered within the oscillator circuit 33 and fed on outlet 54 into signal processor 34 consisting of a commercially available AC or capacitively coupled high-gain differential amplifier 55, several stages of filters 56 and a zero crossing detector or ZCD 57. The gain of the differential amplifier 55 is preferably set at a gain of about 1000, or 60 dB. The filters 56 produce a 150 to 1200 Hz passband, which covers the range of anticipated Doppler frequency signals encountered in baseball and softball applications with the above oscillator frequency. The filters 56 include, for example, standard twin-tee configuration operational amplifier based 60 Hz and 120 Hz notch filters 56a,56b to suppress AC power circuit interference. The filters 56 also include two second-order, multiple feedback high-pass filters 56d,56e each having a gain of, for example, 2.7 and a 3 dB cutoff frequency of 160 Hz Next, the filters 56 include a single order passive low-pass filter 56e having for example, a 3 dB cutoff frequency of 1200 Hz. The passband can be tailored to fulfill specific needs by selection of the corresponding low and high pass filter component values which establish the corner frequencies The amplified and filtered signal from the filtering stages 56 is fed to the zero-crossing detector (ZCD) 57, which is a standard Schmitt trigger that uses a commercial comparator, with positive feedback to create hysteresis. The ZCD produces a square-wave which is output and applied to the input of an eight-bit microprocessor 36.

The microprocessor 36 is connected to external clock circuit 37 which provides a time reference to the microprocessor 36. The microprocessor 36 is programmed to verify the validity of the received signal, for example, by requiring at least four consecutive Doppler frequency cycles, which causes it to recognize the received signal as a valid Doppler signal reading. When a reading is determined to be a valid Doppler signal reading, the microprocessor calculates the corresponding velocity. The microprocessor 36 has an output 61 that communicates a signal representative of the calculated Doppler speed measurement through appropriate drivers (not shown) to liquid crystal display (LCD) 22 for display. The calculation is made by detecting successive negative edge zero crossings following the depression of the reset button 27, which trigger a microprocessor interrupt that samples the clock 37 to cause the times of each crossing to be stored and so the intervals between them can be calculated. The sampling is terminated after 26 successive negative transitions are stored, or there has been a dead time of at least ⅙ second since the last transition, indicating that the object or target is no longer moving. Once the data has been captured, the differences between transition times are calculated from which the Doppler frequency is determined. In making the calculations, the microprocessor 36 enhances the speed reading validity by starting with the difference between the first two recorded time readings and then looking for a sequence of at least three consecutive periods that are within 25% of each other. If none is found, the process is started over and additional readings are stored. When three consecutive readings within 25% of each other are found, the data is scanned until three consecutive readings are not within 25% of each other, whereupon the calculations are averaged. The averaged calculated Doppler frequency value is then converted to the selected units and displayed. Velocity can be displayed in miles-per-hour, kilometers per hour or meters per second in the preferred embodiment, selectable by the user by way of the MODE switch 26, which is a pushbutton switch which, when depressed, sequentially steps the display 22 through the various units, as is convenient for the user.

The electronics are powered by a power supply formed of the battery 31 which is connected/disconnected by the ON/OFF switch 25, which controls signal power to the microprocessor 36, the signal processor 34 and display 22. However, the oscillator transmitter circuit power is controlled by the READY, or RESET switch 27 through the microprocessor 36 when the battery power switch 25 in "ON". Activation of the RESET switch 27 causes the microprocessor 36 to close transmitter power switch 60 which applies electrical power to the transmitter/Doppler sensor circuit 33 for a prescribed time interval (e.g. 10–15 seconds) controlled by the time delay circuit 38, or until a object velocity signal is calculated as controlled by the microprocessor 36, whichever occurs first, after which the transmitter 33 and signal processor circuit 34 are deactivated as the microprocessor causes the switch 60 to turn "OFF". Activation of the RESET switch 26 causes the microprocessor 36 to reset the LCD 22, which is holding the previously calculated velocity value, and to re-apply power to the transmitter 33 and signal processor 34 for performing the next detection and velocity measurement. In this manner, the transmitter radiated output is limited to just the period of time of actual measurement usage, and battery power is also conserved.

A single transistor oscillator-detector-antenna circuit 33, signal processor 34 with the Doppler bandpass amplifier and the zero-cross detector, eight-bit microprocessor velocity calculator and transmitter controller 36, liquid crystal display 22, single-cell battery power supply 31 and ON/OFF and RESET switches 26 and 27 can easily be packaged in a volume of about 1–3 cubic. For example, the specific embodiment described above can be packaged in a volume of less than two cubic inches using discrete circuit components, and, with appropriate utilization of a custom application-specific integrated circuit (ASIC) and at a frequency of about 5 GHz, the device can be packaged in a volume of approximately one half cubic inch. At higher frequencies of 10 or 20 GHz, which can be used, the package size will be essentially the preferred size of the display.

Those skilled in the art will appreciate that the application of the present invention herein are varied, and that the invention is described in preferred embodiments Accordingly, additions and modifications can be made without departing from the principles of the invention.

Accordingly, the following is claimed:

1. A self-contained self-powered ball speed measuring device that is capable of being mounted, when in use, on the forearm of the catching arm of a person catching the ball, the device comprising:

a self-contained speed determining unit including:

an RF microwave homodyne circuit that includes a single transmit/receive-oscillator/detector/antenna configured to transmit an RF signal generally toward a forward side of the unit and to receive the signal when reflected from and Doppler-shifted by a ball moving toward the unit on the forward side thereof, a filter circuit connected to the homodyne circuit and effective to limit the received signal to frequencies within a limited band, a signal processor configured to measure a Doppler frequency of the limited received Doppler shifted-signal and including a digital processor programmed to calculate the speed of the moving ball from the measured Doppler frequency, a display connected to the signal processor and operable to display the calculated speed in a direction viewable by the person catching the ball, and a self contained source of electrical energy sufficient to power the circuits, the processor and the display; and a securement connected to the unit and configured to support the unit on the forearm of the person catching the ball such that the RF circuit is directed toward the moving object and such that the display is perceivable by such person.

2. The system of claim 1 wherein the user is a person catching the object and wherein:

the securement includes structure connecting the unit to a glove configured to be worn on a catching arm of the user such that the RF circuit is directed toward the moving object and such that the display is perceivable by the user.

3. The system of claim 1 wherein the object is a ball, the user is a person catching the ball, and wherein:

the securement is a ball glove configured to be worn on a catching arm of the person catching the ball, the securement including mounting structure for securing the unit such that the RF circuit is directed toward the moving ball and such that the display is perceivable by the person catching the ball.

4. The system of claim 1 wherein the user is a player interacting with the object and wherein:

the securement is a wrist band configured to be worn on an arm of the player, the securement including mounting structure for securing the unit such that the RF circuit is directed toward the moving object.

5. The system of claim 1 wherein the unit further includes:

a timing circuit connected to the energy source and operable automatically reduce power to the RF circuit of the unit following each use of the unit to measure the speed of an object.

6. The system of claim 1 further comprising:

a user actuatable switch connected to the energy source and operable to apply power to the RF circuit of the unit prior to a use of the unit to measure the speed of an object.

7. The system of claim 1 further comprising:

a user actuatable switch connected to the processor and operable to select a measurement unit mode of the display; and the processor being operable in response to the switch to calculate the speed and control the display in accordance with the selected measurement unit mode.

8. The device of claim 1 further comprising:

a user actuatable switch connected to the processor to select a mode of the display; and the processor being operable in response to the switch to calculate the speed and control the display in accordance with the selected mode.

9. The device of claim 1 wherein:

the self-contained speed determining unit has a range of effectiveness of not more than approximately ten feet.

10. The device of claim 1 wherein:

the transmit/receive—oscillator/detector/antenna of the RF microwave homodyne circuit is a single transistor single transmit/receive—oscillator/detector/antenna.

11. The device of claim 1 wherein:

the self-contained speed determining unit further includes at least one switching element connected between the energy source and the homodyne circuit and operable to energize the transmit/receive-oscillator/detector/antenna of the homodyne circuit to transmit the signal and then to automatically disable the transmit/receive-oscillator/detector/antenna of the homodyne circuit from transmitting the signal after being energized for a predetermined interval of time while the energy source continues to power the display to hold a display of the calculated speed thereon.

12. The device of claim 1 wherein:

design parameters of the speed determining unit are selected such that a Doppler shifted signal received solely from a ball moving within three feet of the device contains sufficient information for the calculation of the speed of the moving ball.

13. The device of claim 1 wherein:

the signal processor is configured to produce a plurality of Doppler frequency measurements from the signal reflected from the moving ball and to compare the measurements and thereby determine the validity of the received signal as a signal Doppler-shifted by the motion of the ball.

14. A self-contained self-powered ball speed measuring device that is capable of being mounted, when in use, on the forearm of the catching arm of a person catching the ball, the device comprising:

a self-contained speed determining unit having a range of effectiveness of not more than approximately ten feet and including:

an RF microwave homodyne circuit that includes a single transistor single transmit/receive-oscillator/detector/antenna configured to transmit an RF signal generally toward a forward side of the unit and to receive the signal when reflected from and Doppler-shifted by a ball moving toward the unit on the forward side thereof, a filter circuit connected to the homodyne circuit and effective to limit the received signal to frequencies within a limited band, a signal processor configured to measure a Doppler frequency of the limited received Doppler shifted-signal and including a digital processor programmed to calculate the speed of the moving ball from the measured Doppler frequency, a display connected to the signal processor and operable to display the calculated speed in a direction viewable by the person catching the ball, and a self contained source of electrical energy sufficient to power the circuits, the processor and the display, at least one switching element connected between the energy source and the homodyne circuit and operable to energize the transmit/receive-oscillator/detector/antenna of the homodyne circuit to transmit the signal and then to automatically disable the transmit/receive-oscillator/detector/antenna of the homodyne circuit from transmitting the signal after being energized for a predetermined interval of time while the energy source continues to power the display to hold a display of the calculated speed thereon; and a securement connected to the unit and configured to support the unit on the forearm of the person catching the ball such that the RF circuit is directed toward the moving object and such that the display is perceivable by such person.

15. The system of claim 14 wherein the user is a person catching the object and wherein:

the securement includes structure connecting the unit to a glove configured to be worn on a catching arm of the user such that the transmitter-receiver is directed toward the moving object and such that the display is perceivable by the user.

16. The system of claim 14 wherein the user is a player interacting with the object and wherein:

the securement is a wrist band configured to be worn on an arm of the player, the securement including mounting structure for securing the unit such that the transmitter-receiver is directed toward the moving object.

17. The device of claim 14 wherein:

design parameters of the speed determining unit are selected such that a Doppler shifted signal received solely from a ball moving within three feet of the device contains sufficient information for the calculation of the speed of the moving ball.

18. The device of claim 14 wherein:

the signal processor is configured to produce a plurality of Doppler frequency measurements from the signal reflected from the moving ball and to compare the measurements and thereby determine the validity of the received signal as a signal Doppler-shifted by the motion of the ball.

* * * * *